April 7, 1931.  B. S. GRAHAM ET AL  1,799,895
APPARATUS FOR TRAINING IN AVIATION
Filed Nov. 29, 1927  5 Sheets-Sheet 1
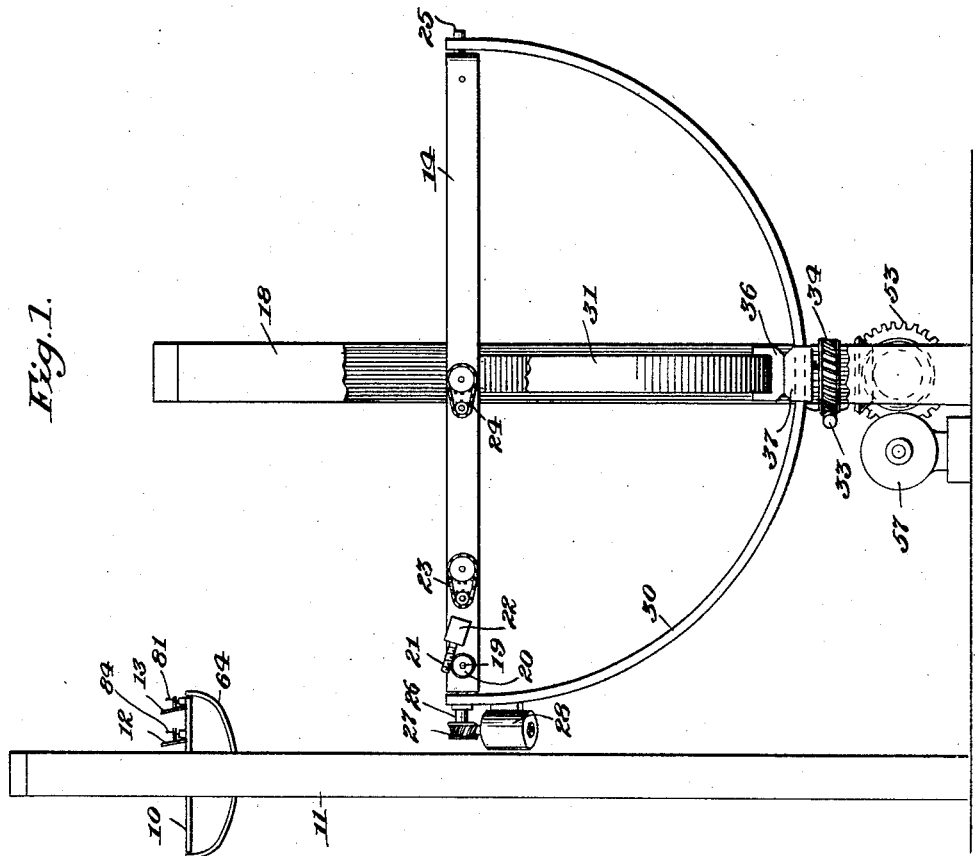
Inventors:
Burdette S. Graham
William C. Morris April 7, 1931.  B. S. GRAHAM ET AL  1,799,895
APPARATUS FOR TRAINING IN AVIATION
Filed Nov. 29, 1927   5 Sheets-Sheet 2
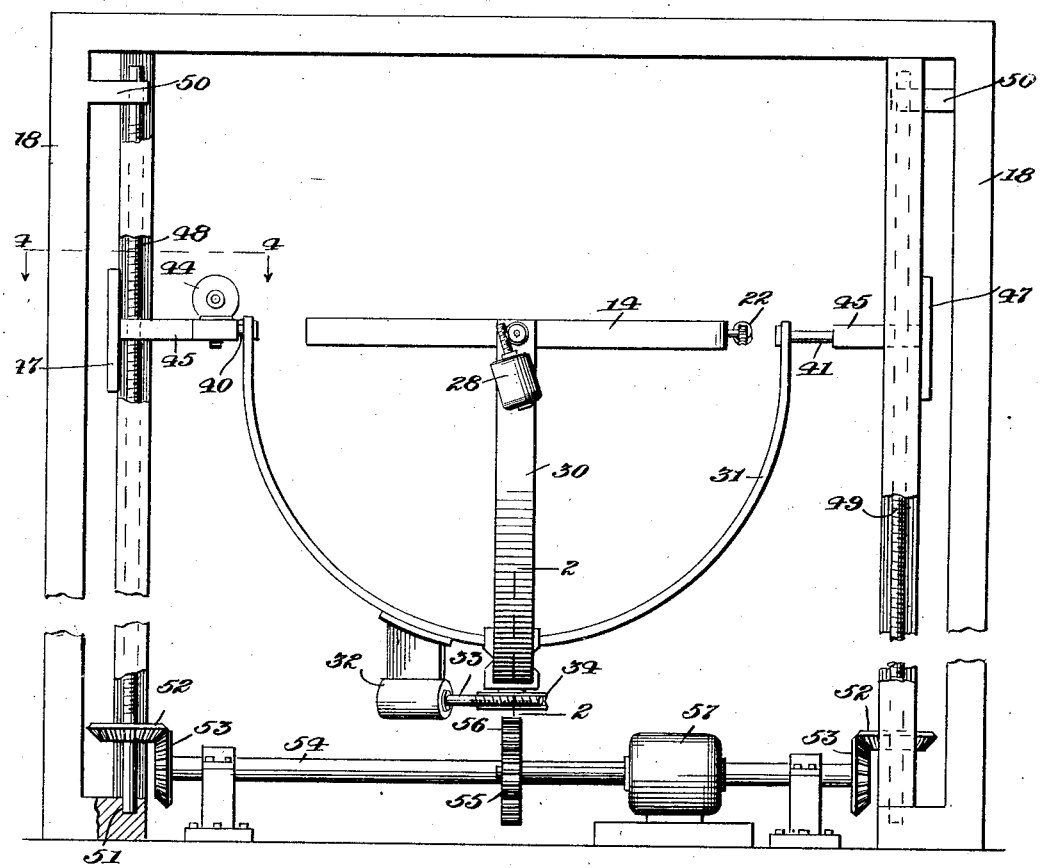
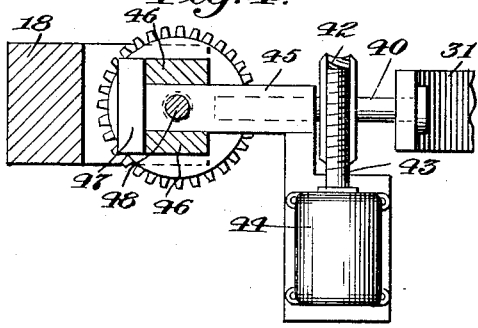
Inventors:
Burdette S. Graham
William C. Morris
Atty.

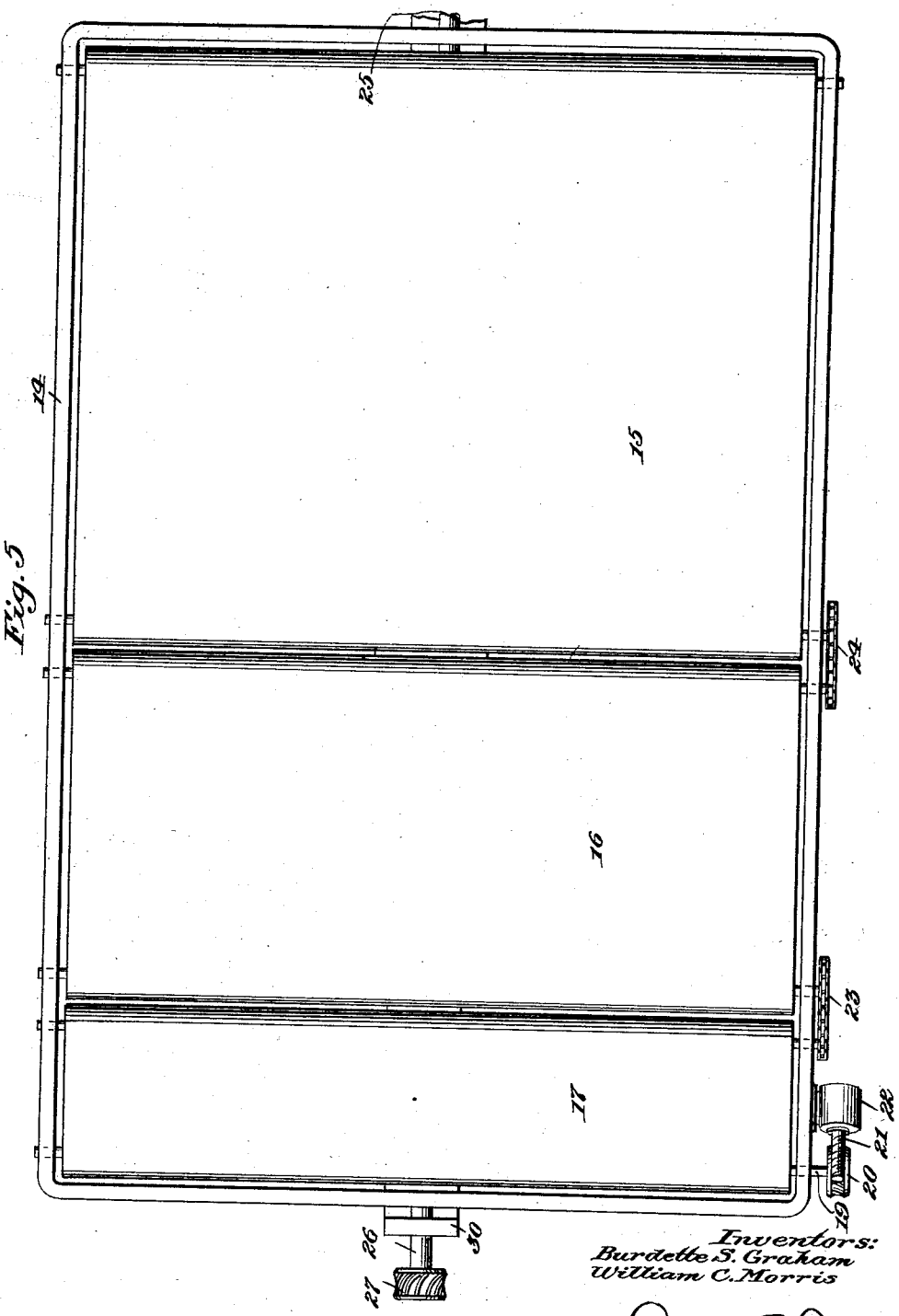

April 7, 1931. B. S. GRAHAM ET AL 1,799,895
APPARATUS FOR TRAINING IN AVIATION
Filed Nov. 29, 1927 5 Sheets-Sheet 4

Inventors:
Burdette S. Graham
William C. Morris

Atty.

April 7, 1931.  B. S. GRAHAM ET AL  1,799,895
APPARATUS FOR TRAINING IN AVIATION
Filed Nov. 29, 1927  5 Sheets-Sheet 5
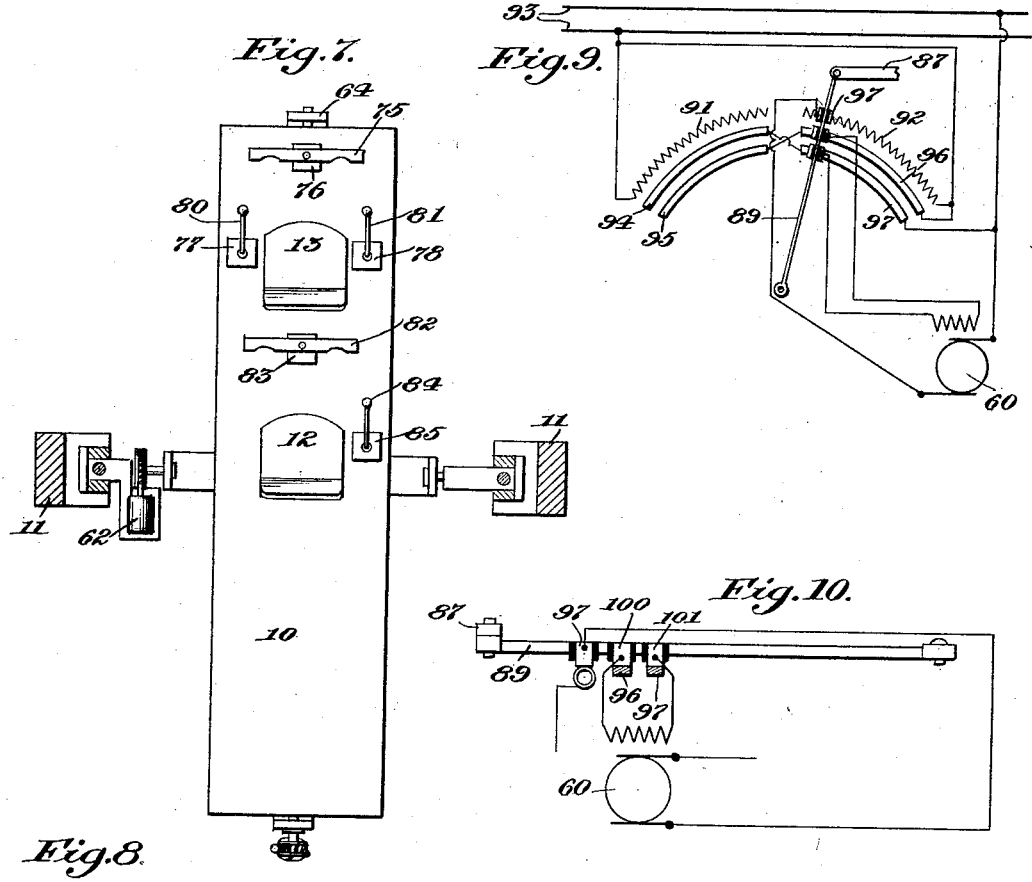
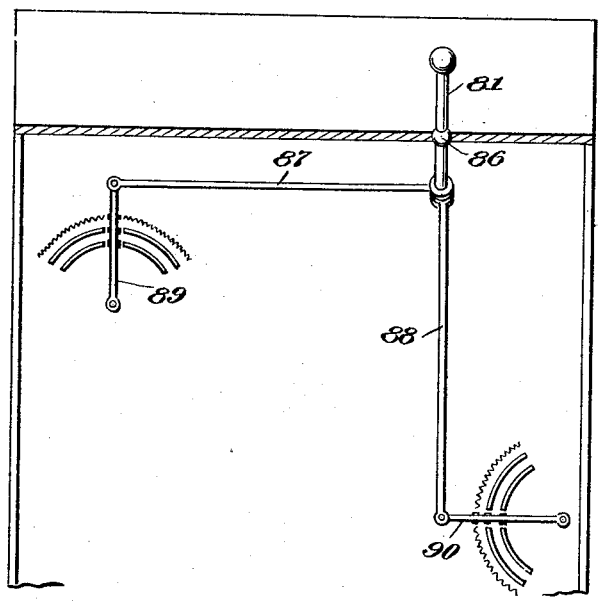
Inventors:
Burdette S. Graham
William C. Morris Patented Apr. 7, 1931

1,799,895

UNITED STATES PATENT OFFICE

BURDETTE S. GRAHAM, OF NORMAN, OKLAHOMA, AND WILLIAM C. MORRIS, OF CONCORD, NORTH CAROLINA

APPARATUS FOR TRAINING IN AVIATION

Application filed November 29, 1927. Serial No. 236,475.

Our invention is designed to provide a method and a means for training and drilling a pupil to manipulate an airplane in maneuvers incident to the training of an airplane pilot, without however necessitating actual flight by the pupil or his instructor and without subjecting the pupil or his instructor to those risks ordinarily attendant upon such training. To accomplish this object it is intended to produce for the student those sensations encountered in actual flight that are essential and necessary in teaching him to manipulate properly an airplane in actual flight and while so doing to teach him and drill him in accomplishing such maneuvers as are encountered in actual flight.

The highest type of airplane pilot is that one who flies by instinct rather than through reason. Reason requires a certain amount of brain action and the reason or brain-action pilot is considered to be a "rule of thumb" or mechanical pilot, and, as such, incompetent and untrustworthy especially at such times as when he is aware that danger is imminent. This for the reason that at such times action of the brain is sluggish, or in the vernacular of the aviator, the brain "freezes" and acts slowly if indeed it acts at all.

Our method of instruction is based upon this, that for every given aerial maneuver, there is a point, line or plane of reference or some combination of them and furthermore that that point, line or plane of reference should be made known and emphasized to the pupil. (It will be understood that when a plane of reference is referred to below, a point, line or plane of reference or some combination of them is meant.) For instance, if an airplane flies straight and level, it does so with respect to some plane of reference, such as the surface of the earth, some portion of the surface of the earth, a layer of clouds, another airplane or airplanes, etc. A pilot of an airplane flies with reference to some such plane of reference at all times when he flies the airplane. This is clearly demonstrated in fog, cloud or darkness flying, for in such cases the pilot who relies upon his sense of balance or so-called "position faculty", which is said to be contained in the ear and which is identified with floating bodies or fluids in the canals of the ear instead of upon fog or cloud or night flying instruments, will find that this faculty, while it eventually warns him that he is upside down or has otherwise departed from the normal attitude, does so only after some force, such as centrifugal force, has ceased to exist, wholly or in part, and this, regardless of the high state of sensitiveness to which this faculty has been developed. It is considered that the pilot who depends upon this sense of balance or position faculty rather than upon the plane of reference method of flying is not a reliable pilot, consequently our method of instruction emphasizes that the sense of balance or position faculty method of instruction is unreliable, and actually dangerous, for the reason that while it warns of a departure from the normal attitude of flight, it does so too late, especially when the airplane is flying near the ground, and that the efficient operation of this faculty depends entirely too much upon the human element, that is, upon the excellent physical condition of the pilot. No attempt therefore is made to cultivate the sense of balance or position faculty, but on the contrary the pupil is warned to avoid such cultivation.

During a first flight in an airplane a noticeable sensation that is produced while the airplane is in straight and level flight with respect to the surface of the earth, is that the airplane is perfectly still or stationary as though rigidly suspended from the sky while the ground has the appearance of slowly unrolling itself, so to speak, beneath and toward the feet of the observer in the airplane and from front to rear of the airplane. On a clear day as the line of sight travels from that spot beneath the airplane towards that farthest in front, sense of movement decreases, until when the line of sight rests on or near the horizon, there is but little or no perceptible movement, in so far as a sense of speed is concerned. This sensation properly developed enables the pupil to manipulate the speediest type of airplane when he has learned to manipulate properly a slower type, for it is obvious that by moving his line of sight towards that portion of the horizon in front of or towards that portion of the ground beneath the airplane, he can slow down or speed up the airplane he is flying in so far as his sense of motion is concerned.

Our method of instruction is based upon this that the particular point or part of the plane of reference to be used by the pupil in a given maneuver is that point or part farthest away from and in front of the airplane. This for the reason that a change of one degree in the attitude of the airplane with respect to the plane of reference would be difficult to detect if the line of sight were on that portion of the point of reference beneath or near the airplane, while, if the line of sight is focused on that portion farthest away from and in front of the airplane, a change of attitude of one inch has the appearance of being multiplied many times the amount of actual change. This sensation of change of attitude which embraces the principle of the lever as taught in mechanics and in statics and dynamics, when properly developed enables the pupil to manipulate the most sensitive and maneuverable type of airplane when he has learned to manipulate properly a less sensitive and less maneuverable type of airplane.

Our method of instruction is based upon this that the throttle and the control of the airplane affect the attitude of the plane of reference with respect to that airplane, rather than that they affect the airplane with respect to the plane of reference. For instance, when the airplane is placed in the position of a glide towards the earth, the pupil is taught to cultivate the feel or sensation within himself that the surface of the earth has elevated itself to hit him in the face and that pulling back the proper amount on the control stick of the airplane pushes the surface of the earth back to its former position; that when the pupil is piloting an airplane with respect to an airplane in a formation of airplanes or is combatting another airplane, the throttle in his airplane controls the other airplane, that is to say, that by increasing or retarding the speed of the motor or engine in his airplane, he draws the other airplane back or nearer to him, or pushes it away from the airplane that he is piloting, etc.

In general our method of instruction is to teach and to drill the pupil in all aerial maneuvers of importance as indicated, particularly in the seven basic maneuvers, to wit: the take-off, the climb, the turn or bank, the straight-and-level, the glide, the level-out process, and the landing, until he is sufficiently disciplined in accomplishing these maneuvers correctly and properly that their proper accomplishment becomes a habit, automatic and instinctive, and requiring little or no conscious thought.

Our invention or means of training the pupil and drilling him in manipulating an airplane comprises a platform which represents the plane of reference when the surface of the earth, any portion of the surface of the earth, etc., is being used as such plane of reference or a structure that represents in appearance an airplane when another airplane is being used as a plane of reference; and a seat or support normally placed in a structure representing an airplane in such a manner that the seat or support represents the seat or support ordinarily occupied by the pilot of the airplane, together with the controls and instruments of an airplane. The platform and the structure representing an airplane are interchangeable and are so placed with respect to the seat or support that they are within the normal field of vision of the pupil when he is seated on the seat or support and are so placed as to be representative of the plane of reference such as the surface of the earth, layer of clouds or of another airplane, etc., with respect to which the pupil is endeavoring to maneuver or is in use as a plane of reference.

The platform and the structure representing the airplane are movable either vertically or rotatively or both in any direction and are governed and controlled in their movements by controls that represent the controls of an airplane. These controls are operated by the student.

The seat or support and its structure representing an airplane within which it is installed is movable either vertically or rotatively or both in any direction and is governed by a control that is operated by the instructor. For instance, the instructor may order the pupil to maneuver straight and level with respect to the platform which represents the surface of the earth. The student will attempt to keep the platform straight and level with respect to the airplane. The instructor, in order to develop the pupil's faculty of reaction to its highest pitch, may tilt the seat or support and its structure at any time and require the pupil to correct for such tilting by moving the platform through the use of his control stick which represents the control stick of an actual airplane.

Broadly, our invention comprises a platform constituting a representation of the ground, means for arbitrarily changing the position of the pupil relative thereto, and means whereby the pupil may move the platform to a new position corresponding to his changed position. Thus, if the pupil's seat is positioned above the platform which represents the surface of the earth or ground and both the seat and the platform are horizontal with respect to one another, the instructor may arbitrarily tilt the pupil's seat, to simulate the effect that a rarefied air area or cross current or an up or a down current of air would have on an airplane and the pupil will thereupon be required to tilt the platform in such amount as will place his seat in the initial relative position thereto. This arrangement may be varied if desired by putting the ground platform under the control of the instructor and the pupil's seat under the control of the pupil. In either case, problems are put to the student to solve, and by solving a sufficient number of similar problems, he acquires skill and speed in solving them, so that eventually, upon any relative movement between his seat and the platform, he will instantly and instinctively manipulate his controls to again bring about the proper relation between the seat and the platform. When his training has progressed to that point where he has learned the basic elements of flying as above mentioned more difficult maneuvers are then undertaken. When sufficiently skilled his training may be completed by actual flight training, the length of time required for which training is materially less than would have been the case had he not received the training discussed above.

An advantage of this system or method lies in the fact that it carries the pupil beyond the most dangerous period of his training, namely, when he knows abstractly how to manipulate an airplane, but cannot think quickly enough to take care of situations as they arise. It also materially reduces that period of an aviator's training which is devoted to flying in a dual control airplane, which period is a hazardous one for both the pupil and the instructor, and is costly for obvious reasons. Perhaps the outstanding advantage of this system of instruction, however, lies in the fact that the pupil's mistakes can be corrected at the time that they are made rather than later. Thus, if the instructor manipulates the pupil's seat to a given position, and the pupil fails to so manipulate his controls as to bring about the proper corresponding movement of the ground, the machine may be stopped and the matter of his error threshed out immediately, whereas, in a dual control airplane such critique is difficult and unsatisfactory to both pupil and instructor whether speaking tubes are used or whether such critique must be postponed until after a landing is made. For in both cases the pupil's recollection of his error and the circumstances surrounding it has become vague or entirely lost through the length of time necessary to explain together with the difficulty of using speaking tubes in airplanes.

Various other objects and advantages of the invention will be in part obvious from the accompanying drawings and in part will be more fully set forth in the following description of one form of mechanism embodying the invention, and the invention also consists in certain novel features of construction and combination of parts hereinafter set forth and claimed.

In the drawings,

Fig. 1 is a view in side elevation of a device embodying the invention;

Fig. 2 is a sectional detail taken on the line 2—2 of Fig. 3;

Fig. 3 is an end elevation of the ground platform and its mounting;

Fig. 4 is an enlarged sectional view taken on the line 4—4 of Fig. 3;

Fig. 5 is a plan view of the ground platform;

Fig. 7 is a sectional view taken on the line 7—7 of Fig. 6;

Fig. 8 is a diagrammatic showing of the mechanism of one of the double rheostat control boxes;

Fig. 9 is an enlarged detailed view of one of the reversing rheostats of Fig. 8; and Fig. 10 is a detailed view comprising a partial cross-section of the rheostat shown in Fig. 9.

Figure 6:
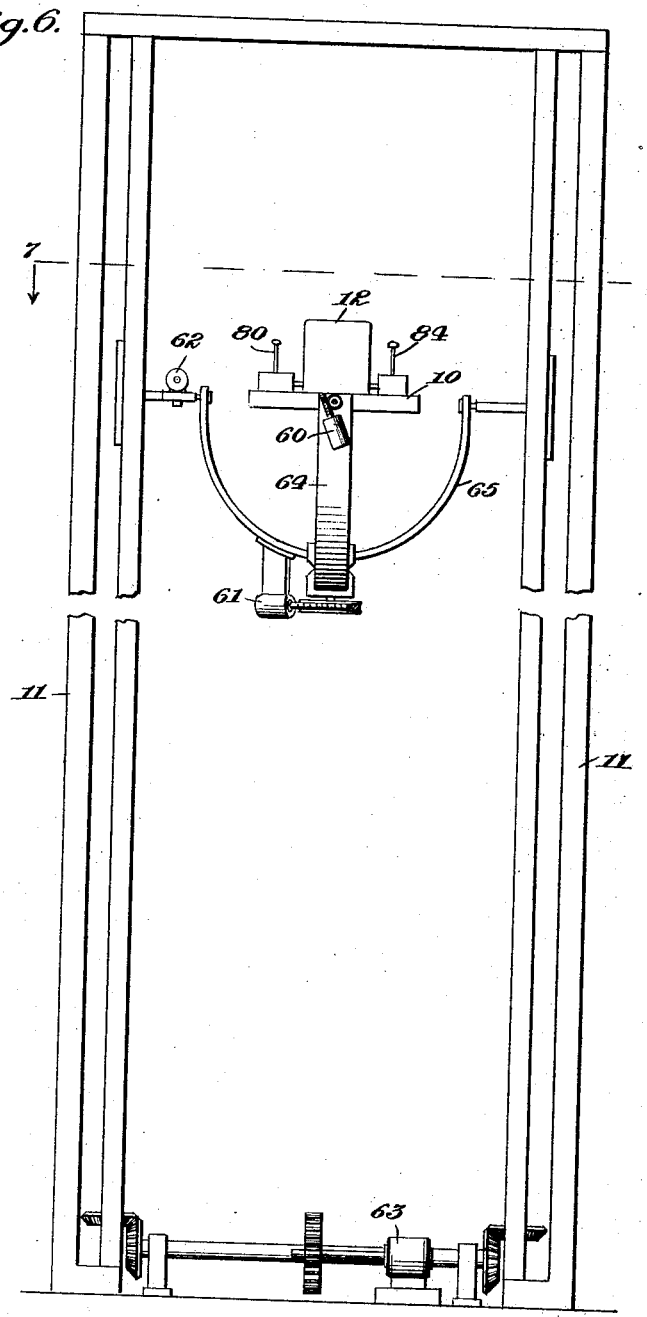
Fig. 6 is an enlarged elevation of the pupil's platform and its mounting.

Referring to Fig. 1, the device broadly comprises a pupil's platform 10 movably supported in a fixed frame 11 and having a seat 12 normally occupied by the pupil and a seat 13 normally occupied by the instructor. The representation of the ground is formed of a frame 14 having a plurality of endless aprons 15, 16 and 17 mounted therein to form a platform (Fig. 5), the platform being movably supported in a fixed frame 18. The aprons are preferably of varying lengths, the shortest apron 17 being nearest to platform 10, and are differentially driven, apron 17 being driven at the highest speed, and the longest apron 15 being driven at the lowest speed. This arrangement more nearly simulates the appearance of the ground than would a single apron, since the surface of the ground when viewed from a moving airplane appears to move most rapidly directly beneath the airplane, and less rapidly further away from the airplane.

Apron 17 is mounted upon two rollers journaled in the frame 14, the shaft 19 of one of the rollers being provided with a gear 20 which meshes with a worm 21 driven by a motor 22 fixed to frame 14. Apron 17 drives apron 16 through the medium of a reduction gearing consisting of a chain passing over two sprocket wheels of different diameters, as indicated at 23. A similar reduction gearing 24 carries the drive from apron 16 to apron 15. The aprons may, if desired, be painted or otherwise marked to represent natural features of the terrain, and a moving picture camera may be mounted in such a manner as to use the platform as a screen on which to project pictures representing the terrain.

Instead of endless aprons, it may, in some cases, be preferable to use a sheet of fabric fixed directly to frame 14 as for example when motion pictures are projected.

Frame 14 has stub shafts 25 and 26 fixed to the ends thereof, shaft 26 carrying a gear 27 which is engaged by a worm driven by a motor 28. Shafts 25 and 26 are journaled in an arcuate supporting member 30 which supports the ground platform and which also carries motor 28 fixed thereto by a bracket or other suitable supporting means. Motor 28 is of the reversible type, and it will be obvious that when this motor is driven, it will cause frame 14 to tilt laterally relative to its supporting member 30. Member 30 is itself supported by means of another arcuate supporting member 31 which carries a reversible motor 32 having a worm 33 meshing with gear 34 fixed to a shaft 35 rotatably carried by member 31 and fixed to member 30. Actuation of motor 32 therefore causes member 30 and the ground platform to rotate about an axis perpendicular to the plane of the platform. Suitable bearing members 36 and 37 are provided to minimize friction and to decrease the tendency of shaft 35 to bend. Shaft 35 is keyed to member 30 and bearing member 37 in the manner shown in Fig. 2.

Member 31 has horizontal shafts 40 and 41 fixed thereto, shaft 40 being provided with a gear 42 (Fig. 4) adapted to be driven by worm 43 of a motor 44. Shaft 40 is journaled in a block 45 which supports the motor 44 and is slidably mounted between two vertical guides 46. The block is provided with a vertical member 47 which is in sliding engagement with the outer surfaces of guides 46, and is provided with a threaded aperture in which a vertical screw 48 engages.

Shaft 41 is similarly mounted and is adapted to be moved by a screw 49, but it is not provided with the worm gear and motor. It will be evident that actuation of motor 44 will cause rotation of member 31 about shafts 40 and 41 as pivots, and thereby cause the ground platform to tilt fore and aft. Screws 48 and 49 are journaled in suitable bearings 50 and 51 in frame 18, and are driven by means of bevel gears 52 and 53 from a shaft 54 which in turn is driven by means of gears 55 and 56 from a motor 57. Screws 48 and 49 are oppositely threaded, with the result that rotation of shaft 54 causes the screws to simultaneously raise or lower blocks 45 and all the mechanism carried thereby. Suitable electric leads (not shown) extend from all the motors, the leads from motor 22, for example, being secured to frame 14, member 30, member 31, block 45, and member 47, and thence, with considerable slack, to the floor.

The platform 10 is movably supported in its fixed frame 11 by an arrangement in every way similar to that described in connection with ground platform 14, except that the proportions are modified to accommodate the mounting to the smaller platform 10; and frame 11 and the other vertical members are made longer to permit the platform 10 to rise higher than the ground platform 14. Platform 10 is driven by means of motors 60, 61, 62 and 63, and is carried by supporting members 64 and 65, the details of these members being varied only in proportions from those described in connection with the ground platform. The two seats with which the ground platform 10 is provided, and the controls associated therewith, are arranged to simulate the corresponding members in an airplane. The forward seat 13 is preferably arranged to be operated by the instructor, and has a foot lever 75 mounted in the usual relation thereto, which actuates a control box 76 provided with a reversing rheostat control for motor 61. Two additional control boxes 77 and 78 are provided at opposite sides of the instructor's seat, and each comprises a double reversing rheostat, control box 77 being adapted to control motors 57 and 63, and control box 78 being adapted to control motors 60 and 62. Control box 77 is operated by means of a stick 80 and control box 78 is operated by means of stick 81, the arrangement being such that forward and backward movement of stick 81 causes motor 62 to tilt platform 10 fore and aft with a speed proportional to the forward or backward displacement of the stick from its normal position, whereas, lateral movement of the stick causes motor 60 to tilt the platform sidewise and in the same direction with a speed proportional to the lateral displacement of the stick from its normal position. Similarly, stick 80 may be manipulated to independently or simultaneously move platforms 10 and 14 vertically.

The pupil's seat 12 is provided with a foot lever 82 operating a control box 83, which controls motor 32. The pupil's seat is provided with a stick 84 operating a control box 85 which governs the motors 44 and 28 to respectively cause the ground platform 14 to be tilted fore and aft and laterally with a speed proportional to the displacement of the stick 84. It should be noticed that each of the sticks 80, 81 and 84 may be moved to any diagonal position, in which case it will be displaced both laterally and longitudinally, and will cause simultaneous operation of both of its motors. The mechanism of control boxes 77, 78 and 85 is diagrammatically illustrated in Figs. 8, 9 and 10, in which it will be seen that the stick 81 is pivoted for universal movement at 86 and has secured to its lower end two connecting levers 87 and 88 disposed approximately at right angles to each other and pivoted respectively to rheostat arms 89 and 90. As seen in Fig. 9, each rheostat comprises resistances 91 and 92 connected to one of the mains 93. Bus bars 94, 95, 96 and 97 are arranged concentrically with the resistances, and are cross-connected after the manner of a reversing switch, bars 96 and 97 being connected to opposite mains. Arm 89 carries a contact 97 insulated therefrom and adapted to engage resistances 91 and 92, the contact 97 being connected to reversible motor 60, the other terminal of the motor being connected to one of the mains 93.

Arm 89 also carries contacts 100 and 101 insulated from the arm and adapted to engage the bus bars, the contacts 100 and 101 being connected to the opposite terminals of the exciting winding of motor 60. From this arrangement it will be evident that movement of the upper end of stick 81 to the left of its normal position will bring contacts 97, 100 and 101 into contact with elements 92, 96, and 97 respectively, thereby connecting the armature of the motor through bars 96 and 97, the speed of the motor being controlled by the extent of movement of contact 97 over the resistance, and the direction of rotation being dependent upon whether stick 81 is moved to the right or left.

Various changes may be made in the specific arrangement shown within the scope of the appended claims. Thus, the instructor's seat 13 and its controls may be placed on the floor if found desirable and other means may be used for raising or lowering the instructor's seat such as by mounting it and the structure representing an airplane in which it is installed on a piston that is raised or lowered by air pressure or by suspending it from above through the use of a cable which can be raised or lowered.

Having described our invention, what we claim as new and desire to secure by Letters Patent of the United States is:

1. In a device of the class described, a support for a person, representing the pilot seat in an airplane, a representation of the ground positioned within the field of vision of a person in said support, and means controlled at said support for tilting said representation about three axes at right angles to each other.

2. In a device of the class described, a support for a person, a representation of the ground positioned within the field of vision of a person in said support, means controlled at said support for tilting said representation, and means for vertically moving said representation.

3. In a device of the class described, a support for a person, a representation of the ground positioned within the field of vision of a person in said support, means controlled at said support for tilting said representation, and independent means for tilting said support 4. In a device of the class described, a support for a person, a representation of the ground positioned within the field of vision of a person in said support, means controlled at said support for tilting said representation in any direction, means for vertically moving said representation, and means for tilting said support in any direction.

5. In a device of the class described, a support for a person, a substantially plane member positioned within the field of vision of a person in said support, means for tilting said support in any direction, means for vertically moving said support, means for vertically moving said plane member, and means controlled by said support for tilting said plane member in any direction.

6. In a device of the class described, a support for a person, a representation of the ground positioned in the field of vision of a person in said support, and means controlled from said support for tilting said representation in any direction.

7. In a device of the class described, means for moving a person bodily about three axes perpendicular to each other, a substantially plane member positioned within the field of view of the person being moved, and means whereby the person being moved may bring about corresponding movements on the part of said substantially plane member.

8. In a device of the class described, a support for a person, means for tilting said support about three axes at right angles to each other, means for vertically moving said support, a platform comprising a driven endless apron disposed in the field of vision of a person in said support, and means controlled from said support for tilting said platform about three axes at right angles to each other.

9. In a device of the class described, a support for a person, said support being articulated for universal tilting movement, a representation of the ground, said representation being articulated for universal movement, and means controlled by the person in said support for controlling the movements of said representation.

10. In a device of the class described, an object serving as a representation of the ground, a second object positioned above said representation of the ground, means for tilting said representation of the ground in any direction, and means for independently tilting said second object in any direction, whereby said second object may be made to simulate the tilting of an airplane.

11. In a device of the class described, a support for a person, a substantially plane member positioned within the field of vision of a person in said support, means for vertically moving said support and said plane member relative to each other, means for tilting said support, and independent means for correspondingly tilting said plane member, whereby said plane member may be tilted to simulate the apparent tilting of the ground to an aviator in the air, and whereby said support may be similarly tilted to simulate the tilting of an airplane.

12. In an apparatus of the class described for teaching aviation, an object serving as a representation of the ground, a second object positioned above said representation of the ground, means for tilting the first said object serving as a representation of the ground thereby to simulate the apparent tilting of the ground to an aviator in flight, and means for tilting said second object thereby to simulate the tilting of an airplane, whereby said objects may be tilted relatively to each other to simulate the apparent relative tilting of airplane and ground in actual flying.

13. In a device of the class described for teaching aviation, means for moving a person to a tilted position, a representation of the ground positioned within the field of vision of the person being so moved, and means controlled by the person being moved for bringing about a corresponding movement of said representation of the ground, whereby said person may effect a relative tilting between himself and the representation of the ground to simulate flying conditions.

14. In a device of the class described for teaching aviation, a support for a person, a representation of the ground positioned in the field of vision of a person in said support, and means for tilting said representation, whereby said representation may be made to simulate the apparent tilting of the ground to an aviator in actual flight.

BURDETTE S. GRAHAM.
WILLIAM C. MORRIS.